United States Patent [19]

Hochstrasser

[11] Patent Number: 5,551,483
[45] Date of Patent: Sep. 3, 1996

[54] BACKFLOW-PREVENTER

[75] Inventor: Ferdinand Hochstrasser, Auenstein, Switzerland

[73] Assignee: KWC AG, Unterkulm, Switzerland

[21] Appl. No.: 291,473

[22] Filed: Aug. 17, 1994

[30] Foreign Application Priority Data

Aug. 17, 1993 [CH] Switzerland .................. 02447/93

[51] Int. Cl.⁶ .................................. F16K 15/14
[52] U.S. Cl. ............................ 137/846; 137/853
[58] Field of Search .................. 137/218, 844, 137/846, 847, 850, 853

[56] References Cited

U.S. PATENT DOCUMENTS

| | | | |
|---|---|---|---|
| 2,270,737 | 1/1942 | Langdon | 137/846 X |
| 2,382,427 | 8/1945 | Langdon | 137/846 X |
| 2,621,889 | 12/1952 | Annin | 137/853 |
| 2,675,823 | 4/1954 | Langdon . | |
| 2,938,532 | 5/1960 | Fraser | 137/218 |
| 3,060,882 | 10/1962 | Peters | 137/846 X |
| 3,171,423 | 3/1965 | Dillon . | |
| 3,636,968 | 1/1972 | Tine . | |
| 3,818,929 | 6/1974 | Braukmann . | |
| 3,862,640 | 1/1975 | Hechler, IV . | |
| 4,013,088 | 3/1977 | Gocke et al. . | |
| 4,013,089 | 3/1977 | Braukmann . | |
| 4,726,390 | 2/1988 | Franklin . | |
| 4,977,920 | 12/1990 | Oberdorfer . | |
| 5,090,062 | 2/1992 | Hochstrasser . | |

FOREIGN PATENT DOCUMENTS

| | | |
|---|---|---|
| AU-A-45345/89 | 5/1990 | Australia . |
| 0284805 | 10/1988 | European Pat. Off. . |
| 0294549 | 12/1988 | European Pat. Off. . |
| 0432553 | 6/1991 | European Pat. Off. . |
| 0447777 | 9/1991 | European Pat. Off. . |
| 206227 | 7/1907 | Germany . |
| 609275 | 2/1935 | Germany ................ 137/218 |
| 1011732 | 7/1957 | Germany . |
| 114209 | 2/1963 | Germany . |
| 3839650 | 11/1988 | Germany . |
| 3832998 | 4/1990 | Germany . |
| 9113239 U | 2/1992 | Germany . |
| 292211 | 7/1965 | Netherlands ............ 137/844 |
| 344598 | 3/1960 | Switzerland . |
| 1447303 | 8/1976 | United Kingdom . |

Primary Examiner—John Rivell
Attorney, Agent, or Firm—Oblon, Spivak, McClelland, Maier & Neustadt, P.C.

[57] ABSTRACT

To the housing part of a backflow-preventer for a sanitary device there is fastened an outer sleeve, made from elastomeric material, exhibiting a sleeve section which is distanced from the housing part. The outer sleeve embraces an inner sleeve which is fixedly supported to the housing and includes a supporting section, which is dimensioned such that the inner sleeve, when acted on by water flowing in the direction of flow, cannot fold inward. The sleeve section bears, under pretensioning, against the supporting section and is expanded by the pressure of the water so as to clear an opening between the sleeve section and the inner sleeve. If the water current is interrupted, the outer sleeve immediately bears again against the inner sleeve. The end sections of the inner and outer sleeves are configured like a sealing lip. The backflow-preventer prevents water from flowing back, even under the least underpressure on the feed side. Moreover, it is not sensitive to foreign bodies.

7 Claims, 4 Drawing Sheets

BACKFLOW-PREVENTER

BACKGROUND OF THE INVENTION

1. Field of the Invention

The present patent application relates to a backflow-preventer for sanitary devices, especially sanitary fittings.

2. Discussion of the Background

Backflow-preventers or check valves are used in sanitary devices to prevent water from flowing back into a feed line whenever, due to pipe fracture for example, underpressure occurs in said feed line. In sanitary fittings having hose sprinklers, in particular, there is the danger of dirty water being sucked back into the feed line whenever, while the control cartridge of the fitting is open, the sprinkler head is immersed in the dirty water.

Generally, in the sanitary fittings field, commonly known disk valves are used as backflow-preventers. A valve disk is herein forced by means of a spring against a valve seat, so that they close sealtight even under very small return-flow pressures. Due to the axial movement of the valve disks, the guides begin to wear away over time, which can result in the disk valves no longer forming a seal. A further problem with disk valves consists of the fact that, whenever there is an intrusion of foreign bodies, the leakage can be considerable. If a grain of sand gets stuck between the valve disk and the valve seat, for example, a considerable flow cross section may remain clear.

Ball valves, too, are used as backflow-preventers. These valves, which can be produced at little cost, suffer virtually no wear and, having light balls, are quick to react. Where there is disturbance by foreign bodies, the same problems arise, however, as in disk valves. Since the balls are not spring-loaded, they exhibit erratic behavior, however, under small return-flow pressures.

In addition, the use of duckbill valves is also known. These exhibit a cup-shaped or hollow, wedge-shaped valve body made from elastomeric material, which valve body is held in a housing. The wedge-shaped valve bodies exhibit, at the pointed end, a straight slot, which connects the interior of the valve body to the environment. That wall of the valve body which limits the slot thus forms sealing lips. The cup-like valve bodies exhibit, in the region of the base, a rectilinear slot, which is limited by sealing lips which project outwards and are formed onto the base. If overpressure exists in the interior of the valve bodies, the slots open and the water is able to flow out through them. If underpressure exists in the interior, however, the sealing lips are pressed against one another by the higher ambient pressure and prevent any return flow. These valves exhibit virtually no wear, have low production costs, and still have relatively good closing characteristics if foreign bodies have intruded into the slot, since the thin sealing lips hug closely to them. A drawback, however, is that the sealing lips only come to bear fully against one another when there is a relatively high backwash pressure, with the result that they display erratic behavior under very small backwash pressures.

From U.S. Pat. Nos. 2,270,737 and 2,382,427, backflow-protection devices are known, which prevent water from being sucked back out of toilet bowls into the feed line by the fact that, in the event of underpressure on the side of the feedwater line, the rinse line is simultaneously ventilated and the back-suction of water is prevented by a check valve-like part. Inserted in the conduit of a tubular housing there is an outer sleeve, which is fastened to the housing by its end region on the inlet-side and is radially supported by means of an inner flange. Downstream of the inner flange, the outer sleeve exhibits a middle cylindrical section, which is adjoined by a widening end section. In the region of the middle section, the housing is provided with radial conduits, which are connected to the ambient air. Downstream of these conduits, the housing exhibits a further inner flange, which, together with the outer sleeve, limits an annular ventilation gap and whose end face facing away from the conduits is conically configured. A bell-like inner sleeve is located within the outer sleeve and bears with its free end region, at a distance from the free end of the outer sleeve, against the end section of the latter. When water flows through, the outer sleeve expands and comes to bear with its end section against the end face of the further inner flange, so as to close the ventilation gap. The escape of water through the conduits is thereby prevented. Under the pressure of the water, the inner sleeve bends inward, creating folds.

In the event of underpressure on the feed side, the outer sleeve is bent inward, so that its end section comes to bear snugly against the inner sleeve in order to prevent water from flowing back. At the same time, the ventilation gap is clear in order to ventilate the outlet. Since thin-walled, bell-like sleeves, when they bend inward, necessarily form wave-like folds or buckles, a subsequent, clean bearing contact against the outer sleeve is only guaranteed provided its inner contacting surface of the end section is correspondingly matched to the outer contour of the inner sleeve interacting therewith. In other words, the outer sleeve may bear against the inner sleeve with no or only extremely low pretensioning. This can result in the valve no longer being guaranteed to close cleanly under low return-flow pressures.

SUMMARY OF THE INVENTION

The object of the present invention is to provide a backflow-preventer which operates reliably even under small return-flow pressures and exhibits good sealing properties in the event of disturbance by foreign bodies.

This object is achieved by a backflow-preventer exhibiting the features now claimed.

Since the outer sleeve interacts with a supporting section of the inner sleeve, which supporting section is shaped and dimensioned such that it does not form folds as a result of the flowing water and assume a wave-like or buckled shape, the outer sleeve can bear against the inner sleeve under considerable pretensioning, without the danger of cavities being present between the sleeves. The return-flow of water, furthermore, is thereby securely prevented. The sealing lip-like configuration of the free end regions of the outer and inner sleeve allows good hugging of possible foreign bodies. The leakage rate is thus reduced to a minimum, even where there are foreign bodies stuck between the outer and the inner sleeve. Since the outer sleeve ends beside the free end of the inner sleeve, the danger is eliminated of one of the sealing lips lifting away from the other if a column of water, on the outlet side, should run up onto the sleeves.

A particularly simple embodiment of the backflow-preventer according to the invention is claimed.

In a further preferred embodiment, the danger that water flowing in from the outlet side might lift the expandable outer sleeve away from the inner sleeve is countered.

Further, particularly preferred embodiments of the backflow-preventer according to the invention, exhibiting a small number of parts, are also defined in the claims.

In a likewise additional preferred embodiment, the supporting section is able to yield elastically to the flowing water in order to clear the flow cross section. At the same time, in the event of overpressure on the outlet side, the supporting and sealing lip section is forced against the outer sleeve.

In a backflow-preventer intended for installation in a sanitary fitting, the sealing and centering, in yet another embodiment, is guaranteed in a particularly simple manner.

In a still further preferred embodiment for the secure fixing of the inner sleeve to the bearing element, a fixed and immovable seat is provided for the inner sleeve, especially in the shut-off direction.

BRIEF DESCRIPTION OF THE DRAWINGS

The present invention is now explained in greater detail with reference to two illustrative embodiments represented in the drawing, in which, purely schematically.

DESCRIPTION OF THE PREFERRED EMBODIMENTS

Figure 1:
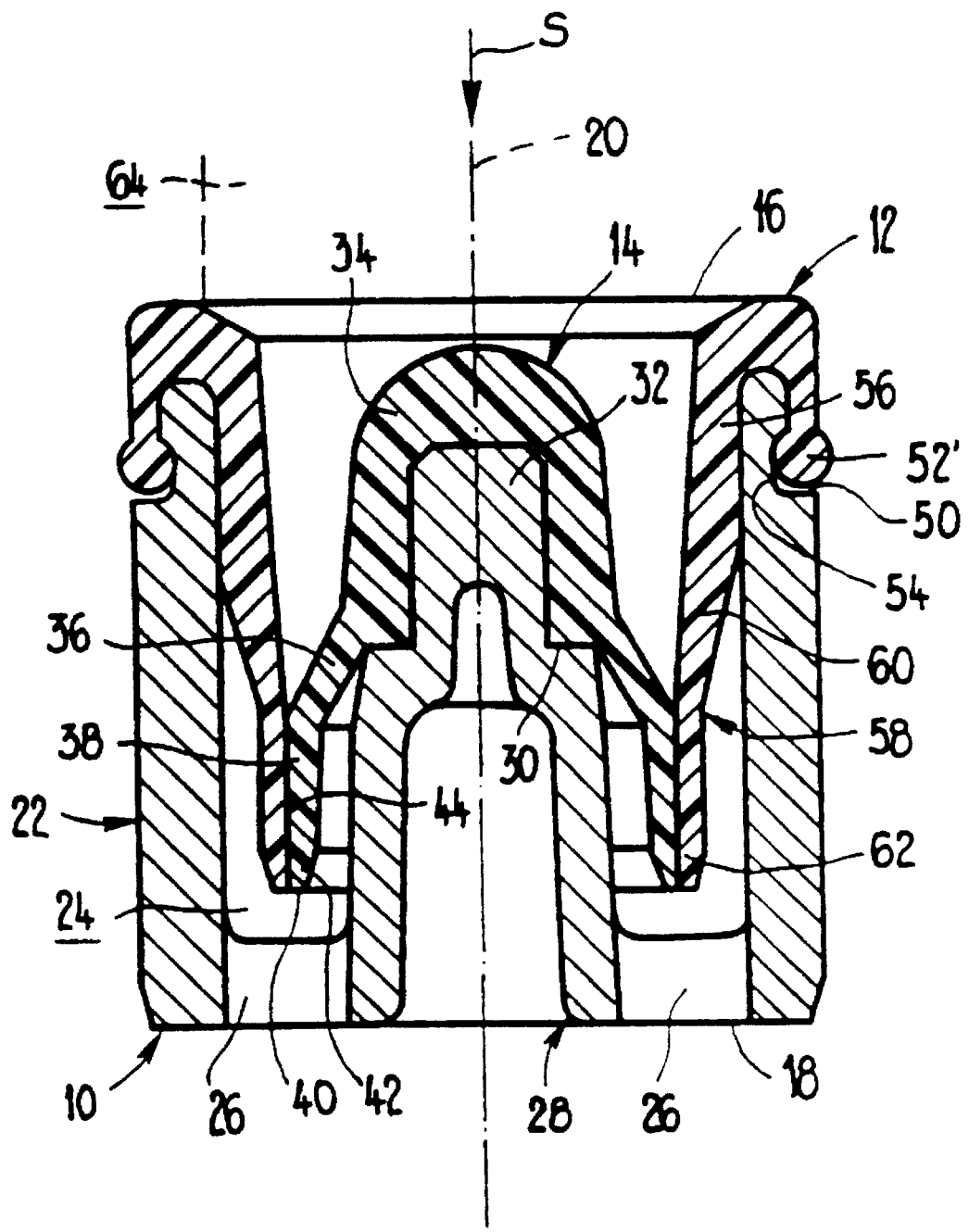
FIG. 1 shows, in a longitudinal section, a first embodiment of the backflow-preventer according to the invention.
Figure 5:
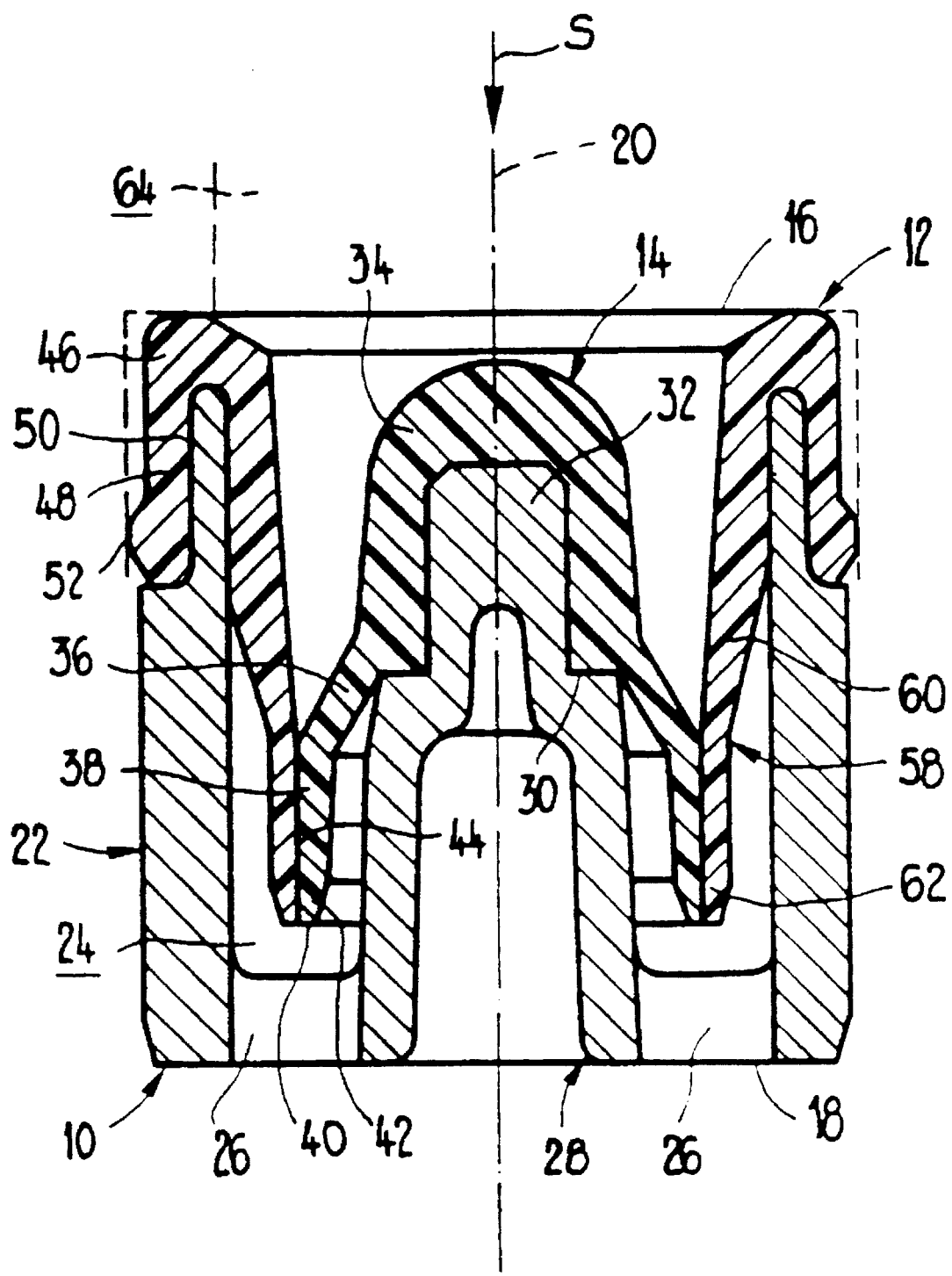
FIG. 5 shows a fifth embodiment of the present invention.

The backflow-preventer (check valve) shown in FIGS. 1 and 5 are of particularly simple construction and exhibit only three parts: a housing 10, preferably made from plastic, an outer sleeve 12 and an inner sleeve 14, both made from elastomeric material. The inlet side of the backflow-preventer is denoted by reference number 16 and the outlet side by reference number 18. The arrow S indicates the direction of flow of the water.

Protruding from a tubular housing part 22, which is rotationally symmetric to the axis 20, are ribs 26, which project in the conduit 24 limited by said housing part and hold a bearing element 28, which is likewise rotationally symmetric to the axis 20. The housing 10 exhibiting the housing part 22, the ribs 26 and the bearing element 28 is constituted by a one-piece injection molding. The bearing element 28, which is shaped like a shank, protrudes in the direction of the inlet side 16 from the ribs 26 disposed on the outlet side 18 of the backflow-preventer and exhibits a step-like taper 30, so that the free end forms a stump 32 on which the inner sleeve 14 is seated with its hat-like fastening section 34. The diameter of the stump 32 is larger than the corresponding recess in the inner sleeve 14, so that the latter, because of its elasticity, bears under a high frictional grip against the stump 32. A positive-locking fastening, for example by means of grooves and beads, is also of course conceivable.

The fastening section 34 is adjoined by a middle section 36, which widens conically, as viewed in the direction of flow S, and is adjoined by a cylindrical supporting section 38, which is adjoined, in turn, by a sealing lip section 42 extending up to the free end 40. The wall thickness of the inner sleeve 14 is chosen so as to be approximately equally large in the region of the middle section 36 and supporting section 38 and such that the supporting section 38 cannot buckle or fold inward in the direction of the axis 20 as a result of the water pressure which is usual in sanitary installations. The buckle-like transition from the conical middle section 36 into the transition from the conical middle section into the supporting section 38 leads to a stiffening of the inner sleeve 14 and reinforces the folding strength.

In the region of the sealing lip section 42, the wall thickness of the inner sleeve 14, as viewed in the direction of flow S, is tapered, so that a soft sealing lip is formed. The cylindrical, outer contacting surface which is common to the supporting section 38 and sealing lip section 42 is denoted by reference number 44. It should further be pointed out, for the sake of completeness, that between the bearing element 28 and the inner sleeve 14, in the region of the middle section 36, the supporting section 38 and the sealing lip section 42, there is a free space present.

The outer sleeve 12 is configured, on the inlet side 16, like a rim flange and embraces with its rim flange 46 the near-sided end of the housing part 22 and engages with its outer rim flange marginal section 48 in a peripheral recess 50 in the housing part 22, which peripheral recess extends up to the near-sided end of the housing part 22. In FIGS. 1 and 5 there are shown two different embodiments of the peripheral recess 50 and of the correspondingly shaped rim flange marginal section 48. The embodiments shown in FIG. 5 is similar to FIG. 1 but the base of the peripheral recess 50 is essentially cylindrically configured and the rim flange marginal section 48 exhibits, in the end region, a peripheral bead 52, which projects in the radial direction over the housing part 22. In the embodiment shown in FIG. 1, however, the peripheral recess 50 is provided with an undercut portion 54, in which there is engaged a thickened portion 52' formed at the free end of the rim flange marginal section 48, which thickened portion, viewed in the radial direction, also projects over the housing part 22.

The outer sleeve 12 bears, with a root region 56 adjoining the rim flange 46, against the inner wall of the housing part 22, and then merges, as viewed in the direction of flow S, into a sleeve section 58 which is distanced from the housing part 22 and the wall thickness of which decreases in a transitional region 60 and then remains essentially constant approximately up to an end section 62 which is tapered like a sealing lip. The outer sleeve 12 bears, under pretensioning, against the contacting surface 44. The transitional region 60 ends, viewed in the direction of flow S, at the contacting surface 44, and the sealing lip-like end section 62 interacts, as a lip seal, with the sealing lip section 42 of the inner sleeve 14. Viewed downstream, the outer sleeve 12 ends at the free end 40 of the inner sleeve 14.

The backflow-preventer shown in FIGS. 1 and 5 is intended for insertion in a cylindrical housing recess 64 of a sanitary fitting, especially having a hose sprinkler. The rim flange 46 herein acts as a seal and the peripheral bead 52 and the thickened portion 52' respectively serve the centering function.

The backflow-preventer shown in FIG. 1 operates as follows: if there is no water flowing in the direction of flow S, the outer sleeve 12 bears with pretensioning against the inner sleeve 14. The pressure of the water flowing in the direction of flow S leads to the expansion of the outer sleeve 12 in the region of the sleeve section 58, which is able to yield in the radial direction. The outer sleeve 12 is thereby raised from the inner sleeve 14, which essentially maintains the original shape, so that the water is able to flow through and flow out through the openings between the ribs 26. If the water current is interrupted, the outer sleeve 12, due to its pretensioning, comes to securely bear snugly again against the contacting surface 44 of the inner sleeve 14. Under return-flow pressure, i.e. when the pressure on the inlet side is less than on the outlet side, the outer and the inner sleeve 12, 14 are pressed against each other even more strongly.

Figure 2:
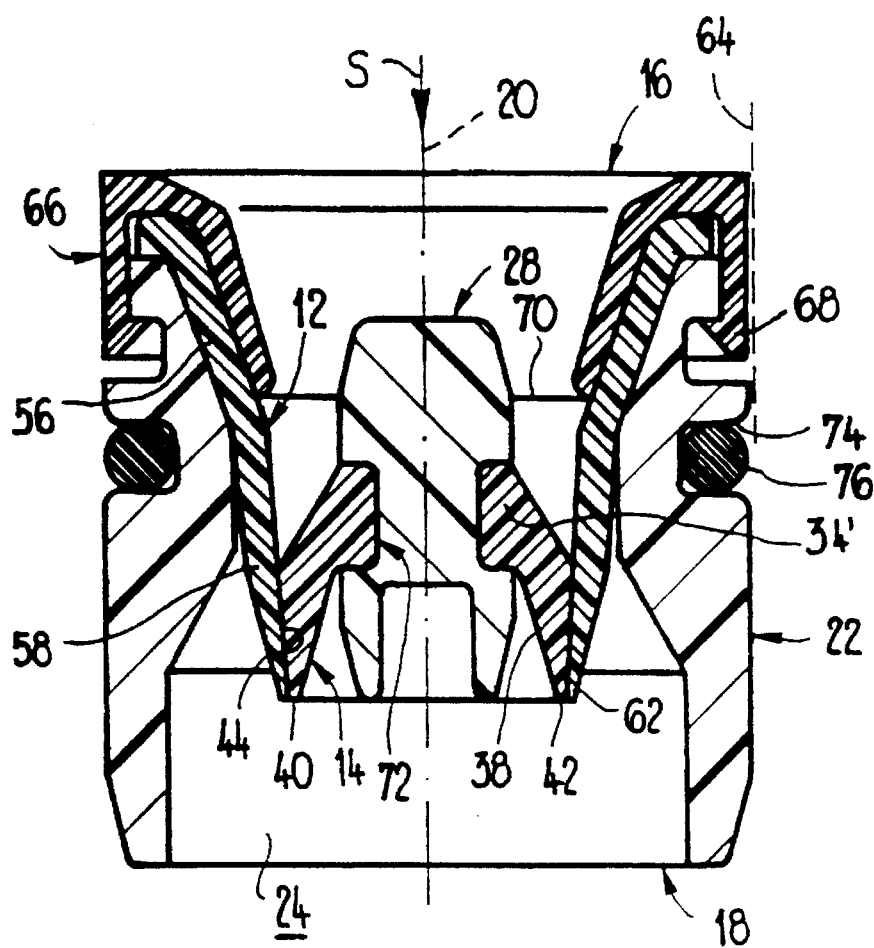
FIGS. 2 and 3 show, in a longitudinal section and in top view, respectively, a second embodiment of the backflow-preventer according to the invention.
Figure 3:
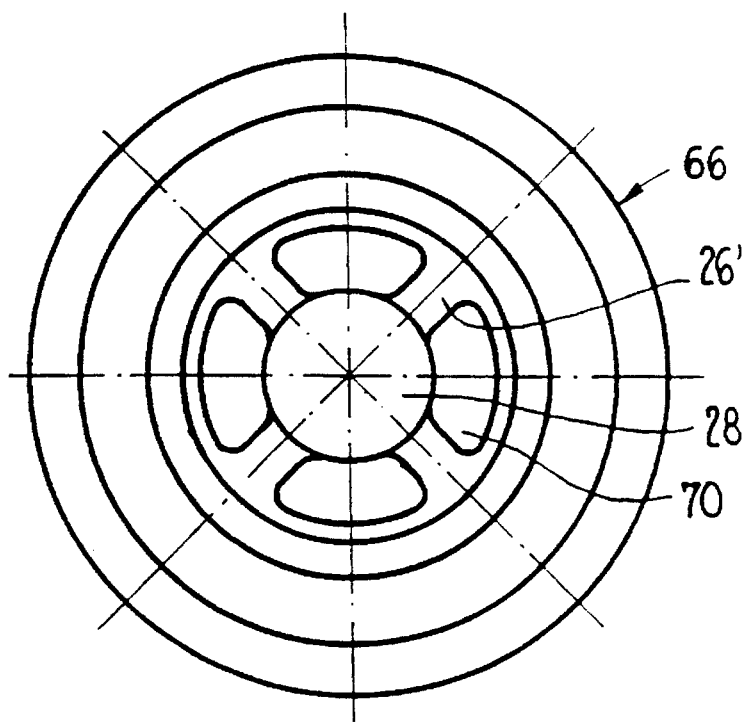

The embodiment of the backflow-preventer shown in FIGS. 2 and 3 also exhibits a housing part 22 rotationally symmetric to the axis 20. Viewed from the inlet side 16 in the direction of the outlet side 18, the conduit 24 limited by the housing part 22 becomes conically narrower, then exhibits in the middle region an essentially constant cross section and is then rewidened. In the conically tapered region, the outer sleeve 12 lies with its root region 56 in bearing contact, which root region also covers the end face, on the inlet side, of the housing part 22. In the root region 56, the outer sleeve 12 is held clamped between the housing part 22 and a fastening socket 66, which is fastened to the housing part 22 by means of a snap connection 68 on the outer side of said housing part.

Viewed downstream, the root region 56 is adjoined by a conical sleeve section 58, which, when there is no water flowing in the direction of flow S, is detached from the housing part 22.

As can be discerned, in particular, from FIG. 3, formed on the fastening socket 66 are ribs 26', which project in the direction of the axis 20 and onto which there is formed, on the other hand, an essentially cylindrical bearing element 28 which is rotationally symmetric to the axis 20. Limited by the ribs 26', the bearing element 28 and the fastening socket 66 are flow conduits 70. Viewed in the direction of flow S, beneath the ribs 26, there is formed on the bearing element 28 a peripheral groove 72, in which the bell-like inner sleeve 14 engages with its fastening part 34'. From the free end 42 facing the outlet side 18, in the direction of the inlet side 16, the inner sleeve 14 exhibits an outer contacting surface 44, which is flatly borne against, under pretensioning, by the outer sleeve 12 and which, as viewed in the direction of flow S, is of a conically tapered configuration corresponding to that section of the outer sleeve which interacts with said contacting surface. The supporting section 38, which is of a fold-resistant configuration and adjoins the fastening section 34', extends in the axial direction at least over part of the contacting surface 44. The supporting section 38 is adjoined, in the direction of the free end 40, by the sealing lip section 42, which, due to the decreasing wall thickness of the inner sleeve 14, is slightly elastically deformable. The wall thickness of the outer sleeve 12, in the section with which it bears against the inner sleeve 14, also constantly decreases as viewed in the direction of flow S, the highly elastic end section 62 forming, together with the sealing lip section 42 of the inner sleeve 14, a lip seal.

The housing further exhibits a groove 74, which is open outwards in the radial direction and in which there is disposed a sealing ring 76, which serves to center the backflow-preventer inserted into a housing recess 64, indicated in dash-dot representation, and to prevent water from flowing between the backflow-preventer and the fitting housing.

The backflow-preventer shown in FIGS. 2 and 3 operates in the same way as the embodiment described further above and shown in FIG. 1. When there is no flow of water, the outer sleeve 12 bears with pretensioning against the inner sleeve 14. If water now flows in the direction of flow S under the pressures which are usual in sanitary devices, the outer sleeve 12 expands and comes to bear against the cylindrical middle part of the housing part 22. A flow opening between the outer and inner sleeves 12, 14 is thereby cleared. If the flow of water is interrupted, the outer sleeve 12 immediately comes to bear again against the contacting surface 44. If an underpressure exists on the inlet side 16 relative to the outlet side 18, a return-flow of water is securely prevented, since, due to the folding strength of the inner sleeve 14, the outer sleeve 12, by virtue of its pretensioning, comes fully to bear. Under these pressure conditions, furthermore, the outer and inner sleeves 12, 14 are pressed against each other.

Here too, the lip seal at the outlet end of the outer and inner sleeves 12, 14, even where there might be foreign bodies present between them, produces good sealing characteristics, since the sealing lip section 42 and the end section 62 come to bear against said foreign bodies. Because of the pretensioning of the outer sleeve 12, a very low leakage rate is guaranteed, even if an elongated foreign body should extend along the whole of the contacting surface 44.

Figure 4:
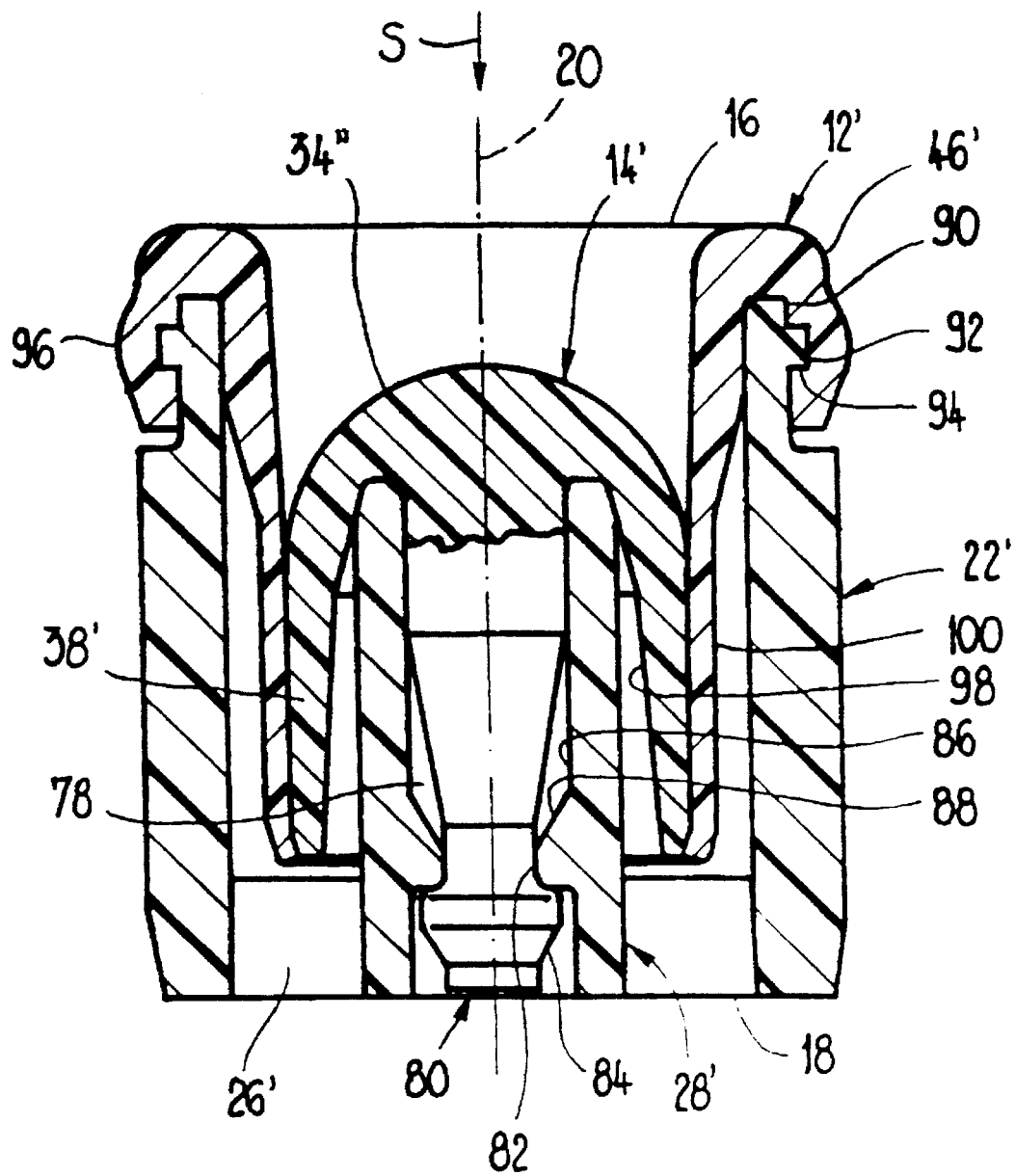
FIG. 4 shows, in a longitudinal section, a third embodiment of the backflow-preventer according to the invention.

The further embodiment of a backflow-preventer represented in FIG. 4 differs from that in FIG. 1, in particular by the fastening of the inner sleeve 14' to the rotationally symmetric bearing element 28', but also by the fastening of the outer sleeve 12' to the tubular housing part 22'.

In contrast to the bearing element 28 in FIG. 1, the bearing element 28', which according to FIG. 4, is likewise connected by ribs 26' to the tubular housing part 22', exhibits in its center an opening 78 extending in the axial direction 20. In this opening 78, the inner sleeve 14', which consists of an elastomeric material, is fastened in a button-like fashion by means of a journal 80, which is formed on in one piece and extends in the direction of the outlet end 18.

For fixing purposes, the opening 78 exhibits a bottleneck 82 and the journal 80 exhibits at its end a section 84, the outside diameter of which is larger than the inside diameter of the bottleneck 82. The journal 80 is placed with its section 84 through the bottleneck 82, the section 84 of the journal being compressed to regain its original shape after passing through the bottleneck 82.

For simplified insertion, the opening 78 exhibits, between a cylindrical region 86 and the bottleneck 82, a conical region 88 which widens in the direction of the outlet end 18.

For easier identification, the journal 80 is represented in solid form, whereas the remaining part of the inner sleeve 14' is shown in longitudinal section.

In the case of the inner sleeve 14', an approximately semispherical, hat-like fastening section 34" is directly adjoined, in the shape of a bell, by a cylindrical supporting section 38'.

The outer sleeve 12' in FIG. 4 is fastened by means of a rim flange 46' to a marginal section 90 of the tubular housing part 22'. For detention purposes, the marginal section 90 exhibits on its outer side a circumferential stem 92, which engages in an annular groove 94 in the rim flange 46'.

In the region of the annular groove 94, the rim flange 46' exhibits on its outer side an annular bead 96, which serves as a seal when the backflow-preventer is inserted in a cylindrical housing recess, such as is indicated, for example, by reference number 64 in FIG. 2.

The embodiment shown in FIG. 4 exhibits, by virtue of the shaping of the outer and inner sleeves 12', 14' facing towards the outlet side 18, particularly large working surfaces on the inner side 98 of the inner sleeve 14' and on the outer side 100 of the outer sleeve 12'. A small pressure difference exhibiting a higher pressure on the outlet side 18 is thereby already sufficient to hold the backflow-preventer securely closed against any backflow. This shaping also produces, furthermore, a relatively long sealing surface viewed in the direction of flow, which sealing surface still guarantees a secure retention even if there are impurities present between the adjacent surfaces of the outer and inner sleeves 12', 14'.

The embodiment according to FIG. 4 is essentially distinguished, however, by the secure anchorage of the outer and inner sleeves 12', 14' to the housing part 22' and to the bearing element 28' respectively.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A backflow-preventer for sanitary devices, especially for sanitary fittings, which comprises:

a housing having a conduit, the housing including an outer sleeve, formed of an elastomeric material, which is disposed in the conduit and is fastened in a sealtight manner to the housing part and which includes a free-ending sleeve section, facing an outlet end of the conduit, wherein the sleeve section, upon water flowing through the outer sleeve from an inlet end of the conduit to the outlet end thereof, is elastically expandable, an inner sleeve which engages the outer sleeve and is fixed to the housing, the inner sleeve including a supporting section which is fold-resistant to water pressure, and a sealing lip section which adjoins said supporting section in the direction of the outlet end, the sleeve section of the outer sleeve engaging, under pretensioning, the supporting section and sealing lip section, of the inner sleeve, forming a sealing lip interacting with the sealing lip section and ending at least substantially in proximity with a free end of the inner sleeve, and a bearing element on which the inner sleeve is disposed and a plurality of ribs protruding from the housing, downstream from the outer sleeve, wherein the ribs project into the conduit and support said bearing element.

2. The backflow-preventer as claimed in claim 1, wherein the inner sleeve is cup shaped and is positioned on the bearing element so as to cover the bearing element on a side facing the inlet.

3. The backflow-preventer as claimed in claim 2, wherein, between the supporting section of the inner sleeve and the bearing element, a free space is formed.

4. The backflow-preventer as claimed in claim 1, wherein the outer sleeve is shaped, in an end region on an inlet side, like a rim flange and covers a near-sided end of the housing.

5. A backflow-preventer for sanitary devices, especially for sanitary fittings, which comprises:

a housing having a conduit, the housing including an outer sleeve, formed of an elastomeric material, which is disposed in the conduit and is fastened in a sealtight manner to the housing part and which includes a free-ending sleeve section, facing an outlet end of the conduit, wherein the sleeve section, upon water flowing through the outer sleeve from an inlet end of the conduit to the outlet end thereof, is elastically expandable, an inner sleeve which engages the outer sleeve and is fixed to the housing, the inner sleeve including a supporting section which is fold-resistant to water pressure, and a sealing lip section which adjoins said supporting section in the direction of the outlet end, the sleeve section of the outer sleeve engaging, under pretensioning, the supporting section and sealing lip section of the inner sleeve, forming a sealing lip interacting with the sealing lid section and ending at least substantially in proximity with a free end of the inner sleeve wherein the outer sleeve is shaped, in an end region on an inlet side, like a rim flange and covers a near-sided end of the housing and wherein a circumferential bead is formed on the rim flange of the outer sleeve, on the outer side of the housing.

6. The backflow-preventer as claimed in claim 1, wherein the bearing element has in a center portion thereof an opening extending in an axial direction, the inner sleeve comprises an elastomeric material, a journal is provided for fastening the inner sleeve to the bearing element, and wherein the journal extends in the direction of the outlet end.

7. The backflow-preventer as claimed in claim 6, wherein the opening in the bearing element includes a bottleneck portion, the journal of the inner sleeve has at an outer end thereof an end section, the outside diameter of which is larger than the inside diameter of the bottleneck, and wherein said end section is fitted in a button-like fashion through the bottleneck.

* * * * *